United States Patent
Kanno et al.

(10) Patent No.: US 10,033,051 B2
(45) Date of Patent: Jul. 24, 2018

(54) FUEL CELL STACK

(71) Applicant: TOYOTA JIDOSHA KABUSHIKI KAISHA, Toyota-shi, Aichi-ken (JP)

(72) Inventors: Daisuke Kanno, Toyota (JP); Makoto Yoshida, Toyota (JP); Tomoo Yoshizumi, Toyota (JP); Yu Morimoto, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 54 days.

(21) Appl. No.: 14/939,866

(22) Filed: Nov. 12, 2015

(65) Prior Publication Data

US 2016/0141633 A1   May 19, 2016

(30) Foreign Application Priority Data

Nov. 14, 2014 (JP) ................. 2014-231689

(51) Int. Cl.
| | |
|---|---|
| *H01M 8/02* | (2016.01) |
| *H01M 8/0206* | (2016.01) |
| *H01M 8/241* | (2016.01) |
| *H01M 8/0267* | (2016.01) |
| *H01M 8/1018* | (2016.01) |

(52) U.S. Cl.
CPC ........... *H01M 8/0206* (2013.01); *H01M 8/02* (2013.01); *H01M 8/0267* (2013.01); *H01M 8/241* (2013.01); *H01M 2008/1095* (2013.01)

(58) Field of Classification Search
CPC ........ H01M 8/02; H01M 8/24; H01M 8/0206; H01M 8/0267; H01M 8/241; H01M 2008/1095
See application file for complete search history.

(56) References Cited

U.S. PATENT DOCUMENTS

| 7,687,175 B2 * | 3/2010 | Abd Elhamid | ..... H01M 8/0206 |
| | | | 429/422 |
| 8,323,851 B2 | 12/2012 | Andreas-Schott et al. | |
| | (Continued) | | |

FOREIGN PATENT DOCUMENTS

| CN | 101075689 A | 11/2007 |
| EP | 1 511 105 A1 | 3/2005 |
| | (Continued) | |

OTHER PUBLICATIONS

Office Action issued in U.S. Appl. No. 14/936,447 dated Jun. 27, 2017.

(Continued)

*Primary Examiner* — Alex Usyatinsky

(74) *Attorney, Agent, or Firm* — Finnegan, Henderson, Farabow, Garrett & Dunner, LLP

(57) ABSTRACT

Disclosed is a fuel cell stack which is able to prevent corrosion from occurring in a separator.

The fuel cell stack formed by arranging a terminal on both ends of a cell stacked body in which a plurality of cells including a membrane electrode assembly and separators interposing the membrane electrode assembly therebetween is stacked, includes a rust preventive plate which is arranged between a metal separator and a positive electrode terminal on a high potential side of the cell stacked body, and includes a material more noble than that of the separator in the surface.

6 Claims, 9 Drawing Sheets

(56) References Cited

U.S. PATENT DOCUMENTS

| | | | |
|---|---|---|---|
| 2005/0260479 A1* | 11/2005 | Raiser ................ | H01M 8/0276 |
| | | | 429/434 |
| 2007/0264556 A1 | 11/2007 | Andreas-Schott et al. | |
| 2008/0241620 A1* | 10/2008 | Ham ................... | H01M 8/0267 |
| | | | 429/514 |
| 2009/0317673 A1* | 12/2009 | Cha ...................... | C23C 14/042 |
| | | | 429/532 |

FOREIGN PATENT DOCUMENTS

| | | |
|---|---|---|
| JP | 58-10378 | 1/1983 |
| JP | 2002-042829 A | 2/2002 |
| JP | 2003-526891 A | 9/2003 |
| JP | 2005-293874 A | 10/2005 |
| JP | 2006-278198 A | 10/2006 |
| JP | 2007-87766 | 4/2007 |
| JP | 2007087766 * | 4/2007 |
| JP | 2007-311343 A | 11/2007 |
| JP | 2009-123446 A | 6/2009 |

OTHER PUBLICATIONS

Final Office Action issued in U.S. Appl. No. 14/936,447 dated Dec. 28, 2017.
Advisory Action issued in U.S. Appl. No. 14/936,447 dated Apr. 19, 2018.

* cited by examiner

FUEL CELL STACK

BACKGROUND OF THE INVENTION

Field of the Invention

The present invention relates to a fuel cell stack.

Background Art

A proton exchange membrane fuel cell (PEMFC) is configured by stacking a membrane electrode assembly (MEA) and a separator. The MEA includes an electrolyte film formed of an ion-exchange membrane, an electrode formed of a catalytic layer which is arranged on one surface of the electrolyte film (an anode, and a fuel electrode), and an electrode formed of a catalytic layer which is arranged on the other surface of the electrolyte film (a cathode, and an air electrode).

The separator includes a fuel gas passage for supplying fuel gas (hydrogen) to the anode, an oxidation gas passage for supplying oxidation gas (oxygen, and in general, air) to the cathode, and a cooling medium passage for flowing through a cooling medium in a power generation region. The separator includes a fuel gas manifold, an oxidation gas manifold, and a cooling medium manifold in a non-power generation region.

A cell module is configured by superposing the MEA and the separator, a cell stacked body is configured by stacking the cell modules, terminals, end plates, and the like are arranged on both ends of the cell stacked body in a cell stacking direction, and the end plates on both of the ends are fastened to a fastening member (for example, a tension plate, a tension bolt, or the like) extending in the cell stacking direction on the outside of the cell stacked body, and thus a fuel cell stack is configured.

In the proton exchange membrane fuel cell, a reaction of converting hydrogen into hydrogen ions and electrons is performed on the anode side, the hydrogen ions are moved to the cathode side through the electrolyte film, and a reaction of generating water from oxygen, hydrogen ions, and electrons (electrons generated in an anode of the adjacent MEA pass through the separator, or electrons generated in an anode of a cell on one end of the cell stacked body flow to a cathode of a cell on the other end of the cell stacked body through an external circuit) is performed on the cathode side.

Anode Side: $H_2 \rightarrow 2H^+ + 2e^-$

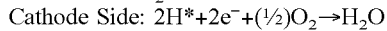

Cathode Side: $2H^+ + 2e^- + (1/2)O_2 \rightarrow H_2O$

When the separator is formed of metal, corrosion occurs in the cooling medium manifold of several cells on a high potential side (+side). It is assumed that this is because in the cooling medium manifold of the stacked cells, for example, when the separator is formed of SUS, Fe ions are eluted on a + electrode side, and OH ions are generated on a – electrode side, and thus $Fe(OH)_2$ is generated (refer to FIG. 7). In addition, the amount of corrosion occurring is indicated by a corrosion current, and it is assumed that the corrosion occurs at a high potential side (refer to FIG. 8). When the corrosion progresses, the sealing reliability of the cell decreases. In addition, it is dangerous since electrolysis may occur in the stack according to high electroconductivity of the cooling medium. In addition, even in a reactant gas manifold (the fuel gas manifold, and the oxidation gas manifold), corrosion may occur by the same mechanism as that in the cooling medium manifold.

In order to solve the problem of the corrosion in the separator, a fuel cell stack including a sacrificial member is known (for example, Patent Document 1 described below). In Patent Document 1 described below, a fuel cell stack is disclosed in which a sacrificial member using a material which is less noble than that of a separator is arranged between the separator and a positive electrode terminal, and thus corrosion in the separator is suppressed.

CITATION LIST

Patent Document

[Patent Document 1] JP2007-087766A

SUMMARY OF THE INVENTION

However, the fuel cell stack disclosed in Patent Document 1 described above has the following problems. That is, a material which is less noble than that of the separator is used in the sacrificial member arranged between the separator and the positive electrode terminal, and thus corrosion easily progresses in the sacrificial member, and corrosion may further occur in the separator.

The present invention is made in consideration of such problems, and an object thereof is to provide a fuel cell stack which is able to prevent corrosion from occurring in a separator.

In order to solve the problems described above, a fuel cell stack according to an aspect of the present invention formed by arranging terminals on both ends of a cell stacked body in which a plurality of single cells including a membrane electrode assembly and separators interposing the membrane electrode assembly therebetween is stacked includes a rust preventive plate which is arranged between the separator and the terminal on a high potential side of the cell stacked body, and includes a material more noble than that of the separator in a surface.

In the fuel cell stack according to the aspect of the present invention, the rust preventive plate which is arranged between the separator and the terminal on the high potential side of the cell stacked body, and includes the material more noble than that of the separator in the surface is provided. Thus, the noble material is used in the surface of the rust preventive plate, and thus it is possible to suppress a corrosion current flowing through the rust preventive plate, and it is possible to suppress the progression of corrosion in the rust preventive plate. As a result thereof, it is possible to prevent corrosion from occurring in the separator, and it is possible to suppress problems such as leakage due to the corrosion in a member.

In addition, in the fuel cell stack according to the aspect of the present invention, it is preferable that the noble material has conductivity and corrosion resistance.

In addition, in the fuel cell stack according to the aspect of the present invention, it is preferable that the noble material includes at least any one material of gold, iridium oxide, palladium oxide, and ruthenium oxide.

In addition, in the fuel cell stack according to the aspect of the present invention, it is preferable that a material of the rust preventive plate includes titanium.

In addition, in the fuel cell stack according to the aspect of the present invention, it is preferable that a material of the separator includes titanium.

In addition, in the fuel cell stack according to the aspect of the present invention, it is preferable that the rust preventive plate is disposed to be electrically connected to a portion on the high potential side of the cell stacked body.

In addition, in the fuel cell stack according to the aspect of the present invention, it is preferable that the rust preventive plate is disposed to be in contact with a cooling medium flowing through the cell stacked body.

In addition, a rust preventive plate for a fuel cell according to another aspect of the present invention is applied to a fuel cell stack including a cell stacked body in which a plurality of single cells including a membrane electrode assembly and separators interposing the membrane electrode assembly therebetween is stacked, and terminals arranged on both ends of the cell stacked body, and is arranged between the separator and the terminal on a high potential side of the cell stacked body, and a material more noble than that of the separator is included in a surface of the rust preventive plate for a fuel cell.

According to the present invention, it is possible to provide a fuel cell stack which is able to prevent corrosion from occurring in a separator.

DESCRIPTION OF THE PREFERRED EMBODIMENTS

Embodiments of the present invention will be described with reference to the following accompanying drawings. The present invention will be described with reference to the following preferred embodiments, but the present invention is able to be changed by various methods without deviating from the range of the present invention, and embodiments other than the embodiments are able to be used. Accordingly, all changes within the range of the present invention are included in claims.

First Embodiment

Figure 1:
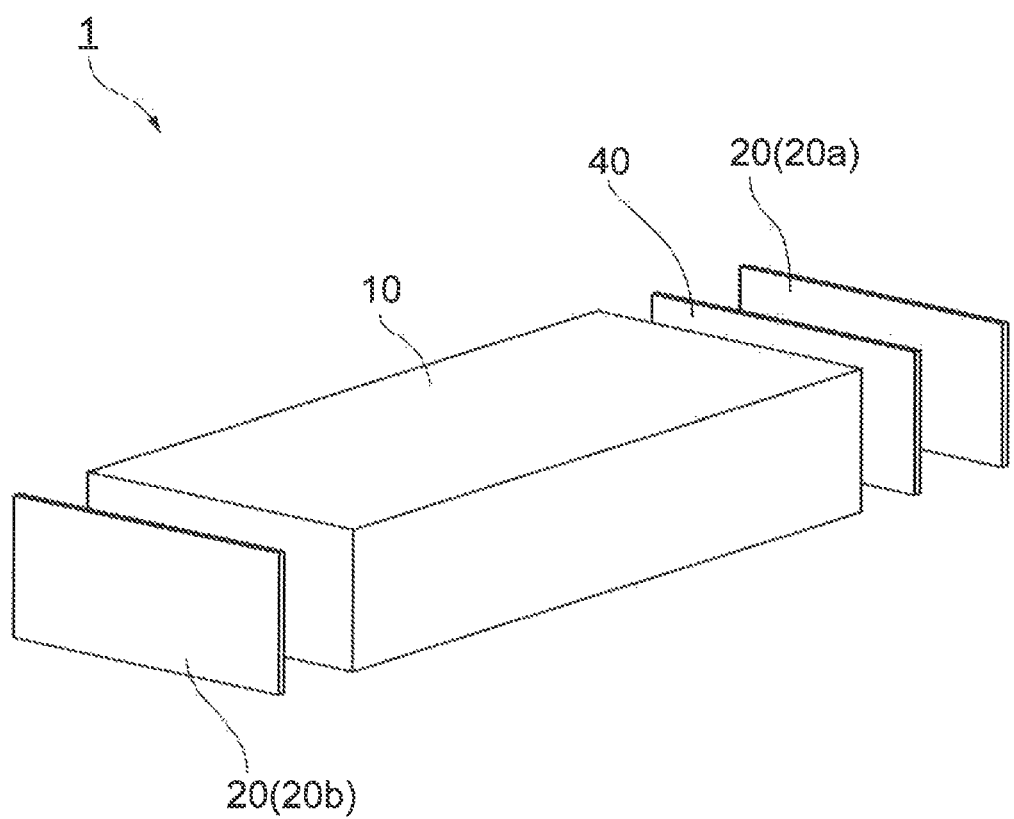
FIG. 1 is an exploded perspective view for illustrating a fuel cell stack according to an embodiment of the present invention.
Figure 2:
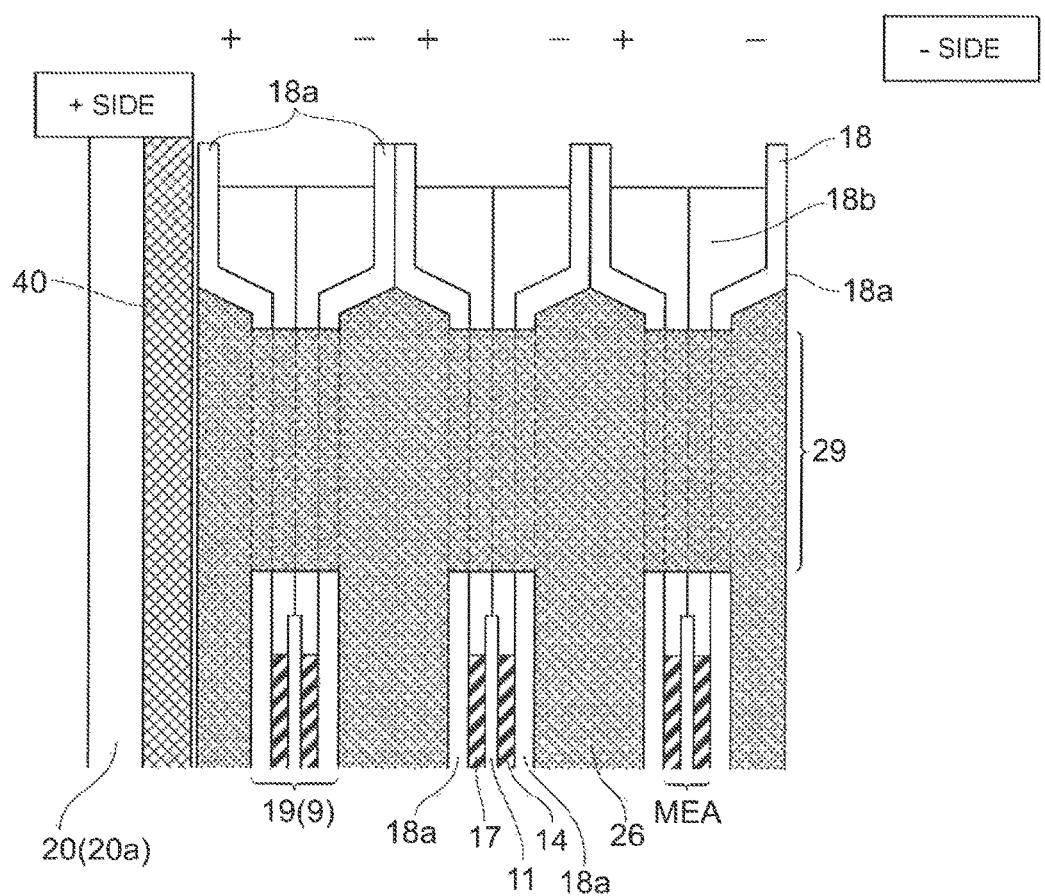
FIG. 2 is a partial sectional view of the fuel cell stack illustrated in FIG. 1.

First, a fuel cell stack including a rust preventive plate for a fuel cell according to a first embodiment of the present invention will be described. FIG. 1 is an exploded perspective view for illustrating a fuel cell stack. FIG. 2 is a partial sectional view of the fuel cell stack illustrated in FIG. 1.

As illustrated in FIG. 1, the fuel cell stack 1 includes a cell stacked body 10, terminals 20, and a rust preventive plate 40. Furthermore, in the example of FIG. 1, for the sake of convenience of description, only the cell stacked body 10, the terminals 20, and the rust preventive plate 40 of the fuel cell stack 1 are illustrated, and the other components are omitted.

Figure 5:
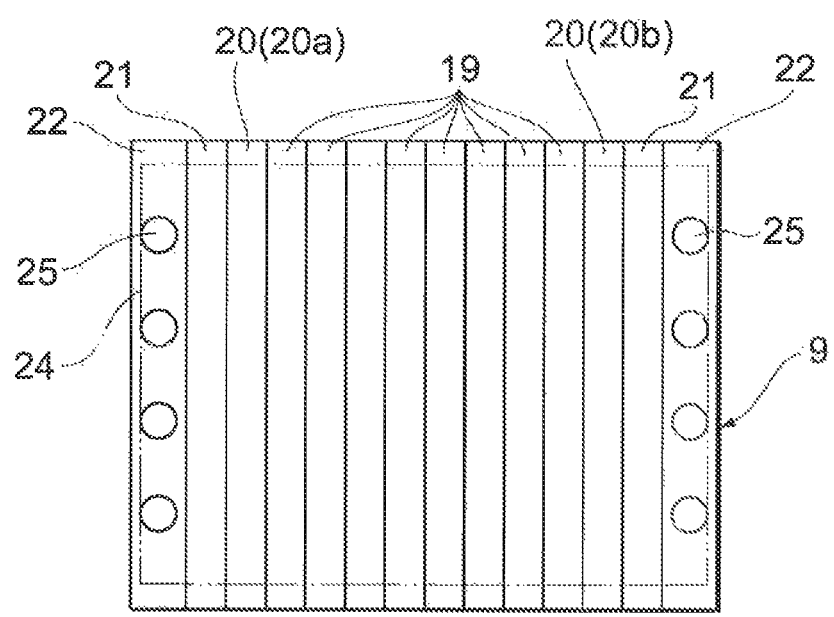
FIG. 5 is a side view illustrating a schematic configuration of the fuel cell stack.

The terminals 20 are metal members which are arranged on both ends of the cell stacked body 10 in a cell stacking direction, and are formed of a positive electrode terminal 20a and a negative electrode terminal 20b, The cell stacked body 10 is formed by stacking a plurality of cell modules 19 (refer to FIG. 5) including a membrane electrode assembly (MEA) illustrated in FIG. 2, and separators 18 interposing the MEA therebetween. As illustrated in FIG. 5, insulators 21, and end plates 22 are arranged on both of the ends of the cell stacked body in which the cell modules 19 (when the number of cell modules is one, a cell 9 (a single cell) is the cell module 19) are stacked in the cell stacking direction, in addition to the metal terminal 20 formed of the positive electrode terminal 20a and the negative electrode terminal 20b, and the end plates 22 on both of the ends are fixed to a fastening member (for example, a tension plate 24) extending in the cell stacking direction on the outside of the cell stacked body by using bolts and nuts 25, and thus the fuel cell stack is configured. A fastening load in the cell stacking direction is applied to the cell stacked body through a spring which is provided on the inside by using an adjusting screw disposed in the end plate on one end.

As illustrated in FIG. 2, the membrane electrode assembly (MEA) includes an electrode (an anode, and a fuel electrode) 14 including an electrolyte film 11 formed of an ion-exchange membrane, and a catalytic layer arranged on one surface of the electrolyte film 11 and an electrode (a cathode, and an air electrode) 17 including a catalytic layer arranged on the other surface of the electrolyte film 11.

As illustrated in FIG. 2, the separator 18 is formed by combining a metal separator (a metal plate) 18a with a resin frame 18b. The material of the metal separator 18a is SUS (Fe, Cr, and Ni), Ti, and the like. The metal separator 18a is covered with a passivation film. The metal separator 18a is electrically connected to the terminal 20. Furthermore, as the material of the metal separator (the metal plate) 18a, for example, titanium (or a material including titanium) is used.

Figure 6:
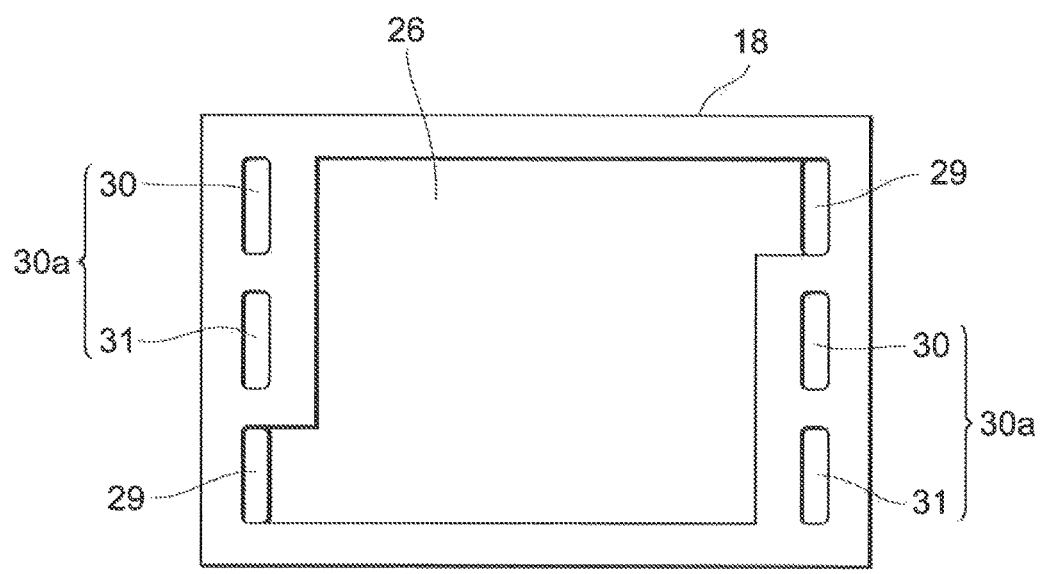
FIG. 6 is a plan view of a cell of the fuel cell stack.
Figure 7:
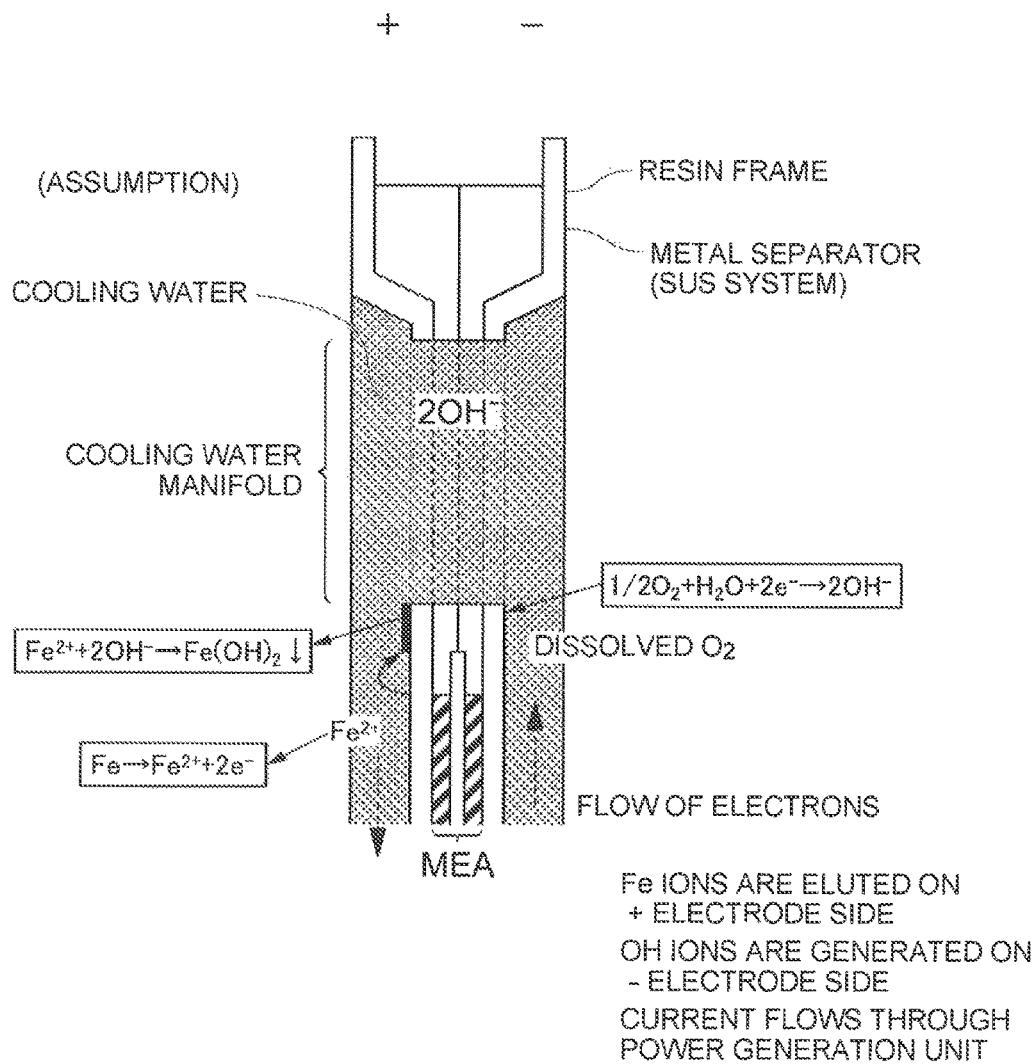
FIG. 7 is a sectional view illustrating (assumed) causes of corrosion occurring in a cooling medium manifold of several cells on a high potential side when a separator is formed of metal.
Figure 8:
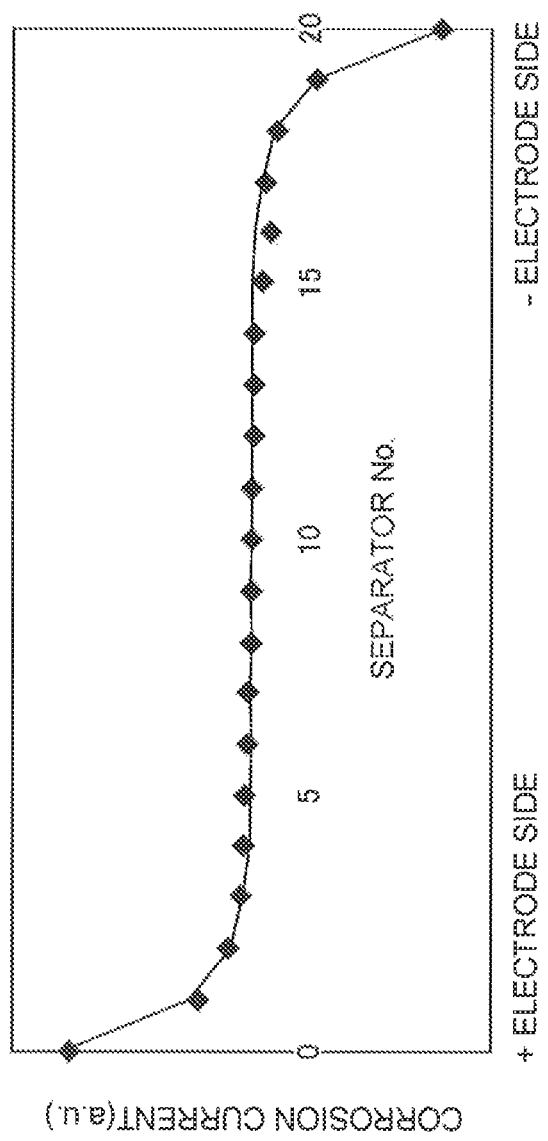
FIG. 8 is a graph illustrating an association between a corrosion current and a separator position number of a fuel cell stack of the related art, and in FIG. 8, "a.u." indicates that the units are an "arbitrary value".

The separator 18 will be further described. In the separator 18, a fuel gas passage (not illustrated) for supplying fuel gas (hydrogen) to an anode 14 and an oxidation gas passage (not illustrated) for supplying oxidation gas (oxygen, and in general, air) to a cathode 17 are formed in a power generation region. In addition, as illustrated in FIG. 6, in the separator 18, a cooling medium passage 26 for flowing through a cooling medium (in general, cooling water) is also formed. In the separator 18, a reactant gas manifold (a fuel gas manifold 30, and an oxidation gas manifold 31) 30a, and a cooling medium manifold 29 are formed in a non-power generation region. The fuel gas manifold 30 is connected to the fuel gas passage, the oxidation gas manifold 31 is connected to the oxidation gas passage, and the cooling medium manifold 29 is connected to the cooling medium passage 26. The reactant gas and the cooling medium are supplied and discharged through a hole of the negative electrode terminal 20b in a stacked state. The fuel gas, the oxidation gas, and the cooling medium are sealed from each other by a sealing material such as an adhesive agent or a gasket.

A dissociation reaction of converting hydrogen into hydrogen ions (protons) and electrons is performed on the anode 14 side of each of the cells 9, the hydrogen ions are moved to the cathode 17 side through the electrolyte film 11, water is generated from oxygen, hydrogen ions, and electrons (electrons generated in an anode of the adjacent MEA pass through the separator, or electrons generated in anode of a cell on one end in the cell stacking direction are moved to a cathode of a cell on the other end through an external circuit) on the cathode 17 side, and thus power generation according to the following equations is performed.

Anode Side: $H_2 \rightarrow 2H^* + 2e^{-1}$

Cathode Side: $2H^* + 2e^- + (\frac{1}{2})O_2 \rightarrow H_2O$

As illustrated in FIG. 1, the rust preventive plate 40 is a member which is arranged adjacent to and between the cell stacked body 10 and the positive electrode terminal 20a. The rust preventive plate 40 is formed of a material having higher conductivity and corrosion resistance than that of the metal separator 18a. The surface of the rust preventive plate 40 is subjected to a surface treatment by using a metal material more noble than the base material of the metal separator 18a. In the first embodiment, as a noble metal material used in the surface of the rust preventive plate 40, gold (Au) is used. Furthermore, as described above, the surface of the rust preventive plate 40 is subjected to a surface treatment using gold (Au) plating, and in addition, the rust preventive plate 40 itself may be configured of a metal material more noble than that of the base material of the metal separator 18a. Furthermore, as the material of the rust preventive plate 40, titanium (or a material including titanium) is used.

Figure 9:
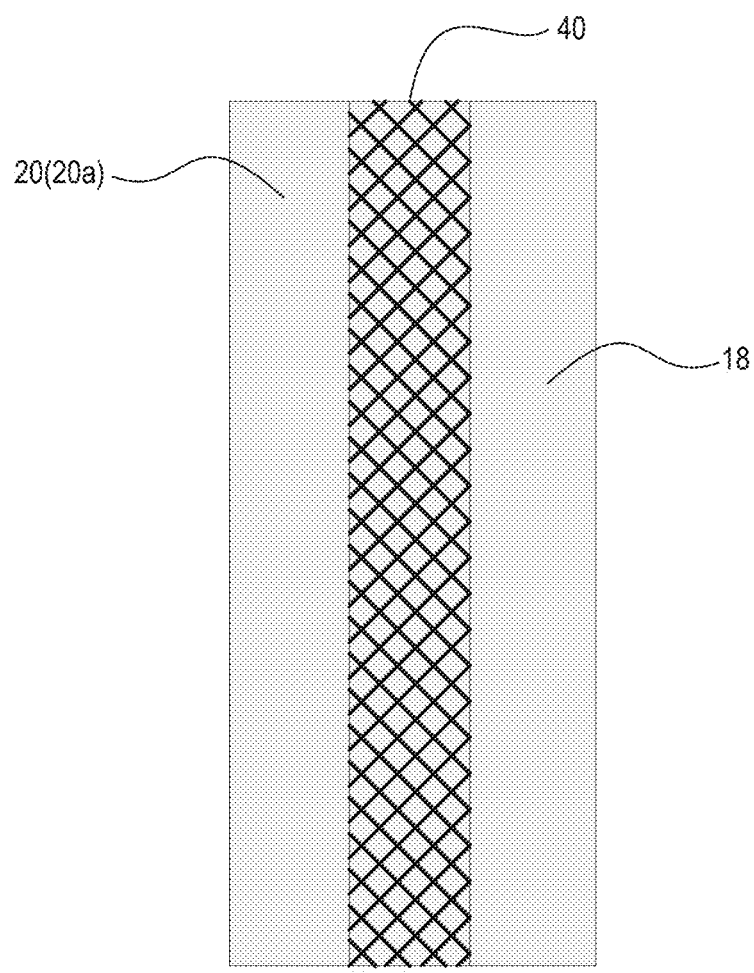
FIG. 9 is a schematic view of the fuel stack illustrated in FIGS. 1 and 2.

The rust preventive plate 40 will be further described. The rust preventive plate 40 is disposed to be in contact with the cooling medium flowing through the cell stacked body 10. The rust preventive plate 40 is disposed to be in contact with at least one of the cooling medium flowing through the cooling medium passage 26 and the cooling medium flowing through the cooling medium manifold 29. The rust preventive plate 40 is electrically connected to the metal separator 18a. The rust preventive plate 40 is disposed such that the rust preventive plate 40 and a portion of the cell stacked body 10 on at least a high potential side (+side) (the positive electrode terminal 20a, the metal separator 18a on an end on the positive electrode terminal 20a side, or the like) conduct. As illustrated schematically in FIG. 9, the rust preventive plate 40 is directly contacted and electrically connected to the separator 18.

Figure 3:
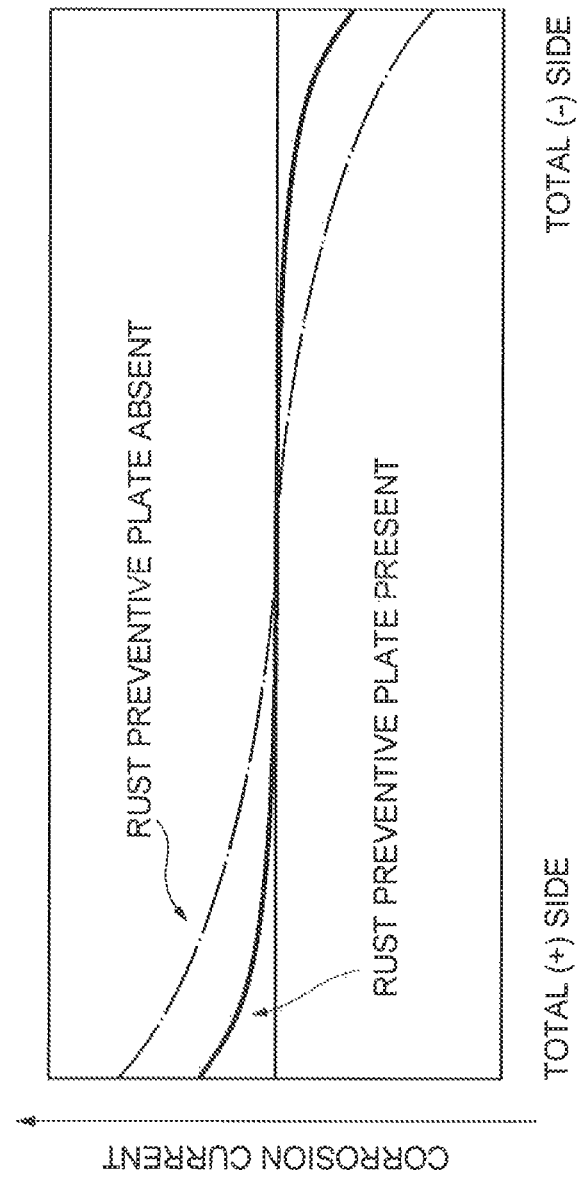
FIG. 3 is a graph for illustrating a corrosion current.
Figure 4:
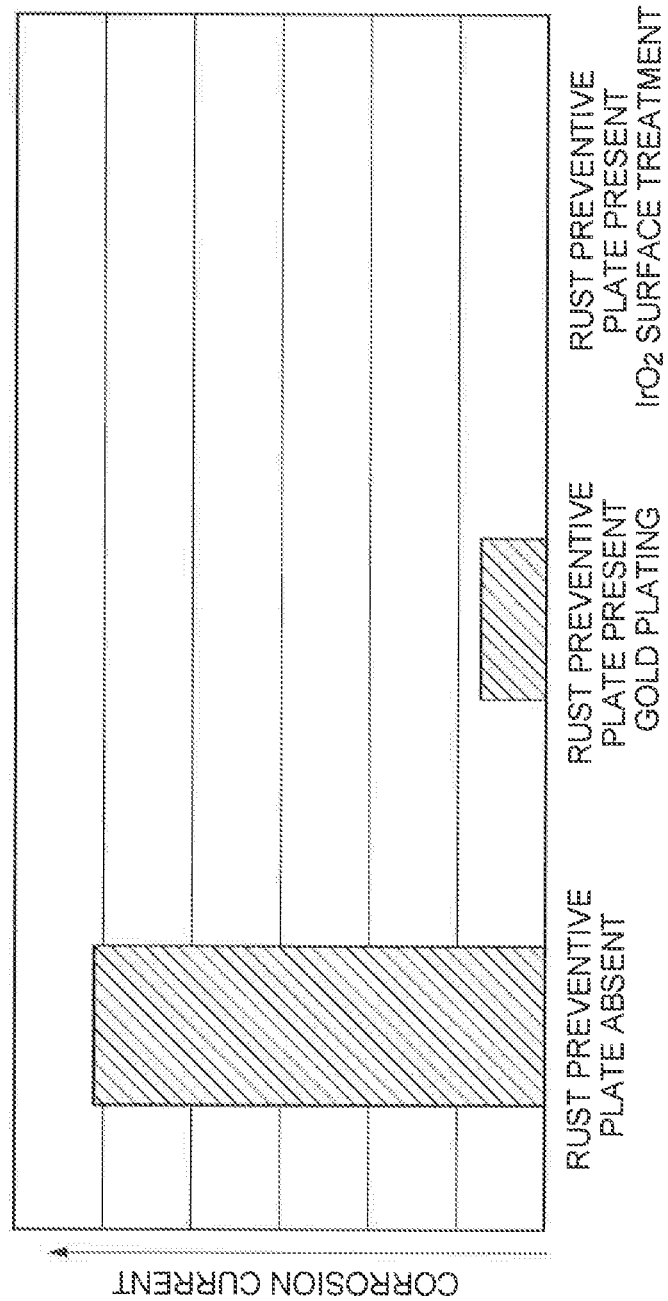
FIG. 4 is a graph illustrating a result of reducing the corrosion current.

As described above, in the first embodiment, titanium (or a material including titanium) is used as the material of the rust preventive plate 40 and the surface of the rust preventive plate 40 is subjected to a surface treatment by using gold (Au) plating. This rust preventive plate 40 is disposed between the positive electrode terminal 20a and the metal separator 18a on the end, and thus on the high potential side (+side), it is possible to suppress a corrosion current flowing through the rust preventive plate 40 (refer to FIG. 3). In addition, as it is obvious in FIG. 4, in comparison with a fuel cell stack in which the rust preventive plate 40 is not provided (Rust Preventive Plate Absent in FIG. 4), it is confirmed that it is possible to considerably reduce the amount of the corrosion current in the fuel cell stack 1 in which the rust preventive plate 40 is provided (Rust Preventive Plate Present, Gold Plating in FIG. 4). Thus, the rust preventive plate 40 is arranged, and thus it is possible to suppress the progression of corrosion in the rust preventive plate 40, and it is possible to further suppress corrosion in the metal separator 18a. As a result thereof, it is possible to suppress problems such as leakage due to the corrosion in a member.

Second Embodiment, Third Embodiment, and Fourth Embodiment

Subsequently, a configuration of a fuel cell stack including a rust preventive plate for a fuel cell according to a second embodiment, a third embodiment, and a fourth embodiment of the present invention will be described. When the second embodiment, the third embodiment, and the fourth embodiment are compared with the first embodiment, the configurations and the functions of the second embodiment, the third embodiment, and the fourth embodiment are identical to those of the first embodiment except that materials used in the surface treatment of the rust preventive plate 40 are different. That is, the configuration of the fuel cell stack in the second embodiment, the third embodiment, and the fourth embodiment is identical to the configuration of the fuel cell stack 1 in the first embodiment which is described with reference to FIG.

The surface of the rust preventive plate 40 in the second embodiment is subjected to a surface treatment using an iridium oxide ($IrO_2$) material. The surface of the rust preventive plate 40 in the third embodiment is subjected to a surface treatment using a palladium oxide material. The surface of the rust preventive plate 40 in the fourth embodiment is subjected to a surface treatment using a ruthenium oxide material. Furthermore, as with the first embodiment, titanium (or a material including titanium) is used as the material of the rust preventive plate 40 in the second embodiment, the third embodiment, and the fourth embodiment.

Thus, in the second embodiment, the surface of the rust preventive plate 40 is subjected to the surface treatment using the iridium oxide ($IrO_2$) material. Accordingly, it is possible to further suppress the amount of the corrosion current (refer to FIG. 4). As a result thereof, it is possible to further suppress the progression of the corrosion in the rust preventive plate 40, and it is possible to further suppress the corrosion in the metal separator 18a. The same effect as that of the second embodiment is able to be obtained in a fuel cell stack in which the rust preventive plates 40 of the third embodiment and the fourth embodiment are provided. Furthermore, as the noble material used in the surface treatment of the rust preventive plate 40, materials other than the materials described above are able to be suitably selected insofar as a function of suppressing the progression of the corrosion in the rust preventive plate 40 is included, and at least any one material of gold, iridium oxide, palladium oxide, ruthenium oxide, and the like described above is able to be included.

As described above, the embodiment of the present invention is described with reference to specific examples. However, the present invention is not limited to these specific examples. That is, examples in which the design of the specific examples is suitably changed by a person skilled in the art are included in the range of the present invention insofar as the characteristics of the present invention are included. The respective elements included in each of the specific examples described above, and the arrangement, the materials, and the shape thereof are not limited to those exemplified, and are able to be suitably changed.

EXPLANATION OF REFERENCES

1: fuel cell stack
9: cell (single cell)
10: cell stacked body
11: electrolyte film
18: separator
18a: metal separator
18b: resin frame
19: cell module
20: terminal 20a: positive electrode terminal
20b: negative electrode terminal
26: cooling medium passage
29: cooling medium manifold
30: fuel gas manifold
31: oxidation gas manifold
40: rust preventive plate

What is claimed is:

1. A fuel cell stack formed by arranging terminals on both ends of a cell stacked body in which a plurality of single cells including a membrane electrode assembly and separators interposing the membrane electrode assembly therebetween is stacked, the fuel cell stack comprising:
   a rust preventive plate which is arranged between the separator and the terminal on a high potential side of the cell stacked body, and includes a material more noble than that of the separator in a surface, wherein the rust preventive plate and the separator are directly contacted with each other at a peripheral edge portion of the separator and electrically connected,
   a cooling medium flowing through the cell stacked body is circulated inside the peripheral portion of the separator, and
   the rust preventative plate is disposed so as to be in contact with the cooling medium.

2. The fuel cell stack according to claim 1, wherein the noble material has a higher conductivity and corrosion resistance than the separator.

3. The fuel cell stack according to claim 1, wherein the noble material includes at least any one material of gold, iridium oxide, palladium oxide, and ruthenium oxide.

4. The fuel cell stack according to claim 1, wherein a material of the rust preventive plate includes titanium.

5. The fuel cell stack according to claim 1, wherein a material of the separator includes titanium.

6. The fuel cell stack according to claim 1, wherein the rust preventive plate is disposed to be electrically connected to a portion on the high potential side of the cell stacked body.

* * * * *